(12) United States Patent
Hall

(10) Patent No.: US 12,343,612 B2
(45) Date of Patent: Jul. 1, 2025

(54) AUTOMATED OFFSIDE DETECTION AND VISUALIZATION FOR SPORTS

(71) Applicant: SportsMEDIA Technology Corporation, Durham, NC (US)

(72) Inventor: Gerard J. Hall, Durham, NC (US)

(73) Assignee: SportsMEDIA Technology Corporation, Durham, NC (US)

( * ) Notice: Subject to any disclaimer, the term of this patent is extended or adjusted under 35 U.S.C. 154(b) by 617 days.

(21) Appl. No.: 17/858,678

(22) Filed: Jul. 6, 2022

(65) Prior Publication Data
US 2023/0009700 A1  Jan. 12, 2023

Related U.S. Application Data

(60) Provisional application No. 63/219,551, filed on Jul. 8, 2021.

(51) Int. Cl.
*A63B 71/06* (2006.01)
*A63B 24/00* (2006.01)

(52) U.S. Cl.
CPC ...... *A63B 71/0605* (2013.01); *A63B 24/0021* (2013.01); *A63B 2024/0025* (2013.01)

(58) Field of Classification Search
None
See application file for complete search history.

(56) References Cited

U.S. PATENT DOCUMENTS

| | | | |
|---|---|---|---|
| 6,965,397 B1 | 11/2005 | Honey et al. | |
| 7,139,582 B2 * | 11/2006 | Couronne | A63B 71/0605 370/320 |
| 8,279,051 B2 | 10/2012 | Khan | |
| 8,279,282 B2 | 10/2012 | Inagaki et al. | |
| 8,300,935 B2 | 10/2012 | Distante et al. | |
| 8,358,907 B2 | 1/2013 | Inagaki et al. | |
| 8,543,525 B2 * | 9/2013 | Distante | G06V 10/24 382/156 |
| 9,202,526 B2 | 12/2015 | Hohteri et al. | |
| 9,747,870 B2 | 8/2017 | Gillard et al. | |
| 9,978,425 B2 | 5/2018 | Kirk et al. | |

(Continued)

FOREIGN PATENT DOCUMENTS

| | | | | |
|---|---|---|---|---|
| EP | 2012886 B1 | * | 11/2010 | ......... A63B 24/0021 |
| GB | 2348757 A | * | 10/2000 | ......... A63B 24/0021 |
| WO | WO-2007132415 A1 | * | 11/2007 | ......... A63B 71/0605 |

OTHER PUBLICATIONS

A Method of Detecting Situations of Off-side Football and Installation for Implementing Said Method. (Year; 1995).*

*Primary Examiner* — Reginald S Tillman, Jr.
(74) *Attorney, Agent, or Firm* — NEO IP

(57) ABSTRACT

The present invention includes systems and methods for automated detection and visualization of offside positions. In soccer, offside is determined by the position of a player relative to the position of players on the opposing team and/or the soccer ball. The present invention provides systems and methods for tracking the location of players on a soccer field and for determining whether a player is in an offside position. The present invention further includes an imaging system for tracking the location of a boundary object that determines where offside positions begin. The system is then operable to enhance image and video data using the data collected during detection of offside positions.

20 Claims, 8 Drawing Sheets

(56) References Cited

U.S. PATENT DOCUMENTS

| | | |
|---|---|---|
| 10,441,868 B2 | 10/2019 | Janssen |
| 10,467,478 B2* | 11/2019 | Chen ........................ G06T 7/70 |
| 10,853,658 B2 | 12/2020 | Ranjan et al. |
| 11,096,140 B2* | 8/2021 | Andon ...................... G01S 5/14 |
| 2003/0049590 A1 | 3/2003 | Feldbau |
| 2008/0002031 A1* | 1/2008 | Cana ................... H04N 23/635 |
| | | 340/572.1 |
| 2009/0298588 A1 | 12/2009 | Gopinath et al. |
| 2014/0111379 A1 | 4/2014 | Schelten et al. |
| 2019/0089923 A1 | 3/2019 | Katano et al. |
| 2019/0261027 A1 | 8/2019 | Hawke |
| 2019/0289275 A1* | 9/2019 | Arai ....................... H04N 23/60 |
| 2021/0133458 A1 | 5/2021 | Tuxen et al. |
| 2021/0182560 A1 | 6/2021 | Richards et al. |

\* cited by examiner

AUTOMATED OFFSIDE DETECTION AND VISUALIZATION FOR SPORTS

CROSS-REFERENCES TO RELATED APPLICATIONS

This application relates to and claims priority from the following U.S. Patent Applications. This application claims priority from and the benefit of U.S. Provisional Patent Application No. 63/219,551, filed Jul. 8, 2021, which is incorporated herein by reference in its entirety.

BACKGROUND OF THE INVENTION

1. Field of the Invention

The present invention relates to automated detection and visualization of rule violations in sports, and more specifically to tracking players in order to determine offside positions.

2. Description of the Prior Art

It is generally known in the prior art to provide systems for filming a sporting event and analyzing the footage to extract gameplay data. It is also known in the prior art to add content to image data to indicate the gameplay data.

Prior Art Patent Documents Include the Following:

U.S. Patent Publication No. 2021/0133458 for system, device and method for master clock and composite image by inventors Tuxen, et al., filed Nov. 3, 2020 and published May 6, 2021, is directed to a system including a sensor capturing sensor data and an imager capturing imager data in combination with a computing device configured to time calibrate the sensor and the imager, detect an occurrence of a first event in the sensor data and extract a first time at which the first event occurred, and identify a first image in the image data having a capture time correlating to the first time at which the first event occurred in combination with retrieving the first image for insertion into a composite image including further image data combined with at least a portion of the first image depicting the first event.

U.S. Pat. No. 10,853,658 for image-based detection of offside in gameplay by inventors Ranjan, et al., filed Oct. 30, 2018 and issued Dec. 1, 2020, is directed to an electronic device for image-based detection of offside in gameplay. The electronic device estimates positions of each player-object of a first team and a second team in a current image and further estimates displacement and velocity values of a soccer-object. The electronic device detects a pass state of the soccer-object based on the displacement and the velocity values. The electronic device determines a set of passive offside positions of a set of player-objects of the first team based on the estimated positions of the each player-object of the first team. The electronic device further detects an active offside state of at least one player-object in the set of player-objects, based on a first distance between the soccer-object and each of the set of player-objects, and transmits a notification to a referee of the gameplay, in real-time or near real time, based on the detected active offside state.

U.S. Patent Publication No. 2019/0261027 for image processing apparatus and methods by inventor Hawke, filed Feb. 14, 2019 and published Aug. 22, 2019, is directed to an image processing apparatus including display circuitry that controls a display to simultaneously display a plurality of images associated with an event; eye tracking circuitry that tracks the position of at least one eye of a user viewing the displayed plurality of images; and processor circuitry that performs a predetermined operation associated with one of the plurality of images in accordance with the tracked position of the eye of the user, the image processing apparatus further comprising user interface circuitry configured to receive a predetermined input from the user, wherein the display circuitry is controls the display to display a first image of the plurality of images is displayed in a first area of the display and a second image of the plurality of images is displayed in a second area of the display.

U.S. Patent Publication No. 2019/0089923 for video processing apparatus for displaying a plurality of video images in superimposed manner and method thereof by inventors Katano, et al., filed Sep. 18, 2018 and published Mar. 21, 2019 is directed to a video processing apparatus including an acquisition unit configured to acquire a video image, an object extraction unit configured to extract a plurality of predetermined objects from the video image, a selection unit configured to select a target object to be an observation target from the plurality of predetermined objects, an evaluation unit configured to evaluate association about time and position information between the target object and an object other than the target object among the plurality of predetermined objects, a determination unit configured to determine a display manner of the plurality of predetermined objects based on the association, and a display unit configured to generate and display an image of the plurality of predetermined objects in the display manner.

U.S. Pat. No. 10,441,868 for full scale digital replay and practice system for use by positional players in a team-based sport by inventor Janssen, filed Apr. 11, 2017 and issued Oct. 15, 2019, is directed to a system for providing player training including a grid of individually powered, processor controlled and communicable lighting elements and sensors which are embedded within a playing surface associated with the event, the lighting elements interfacing with at least one of a player worn sensor and/or a remote processor device for providing a visual illustration of any number of parameters associated with an actual player performance, including real time motion progressions of the player which are represented on the field surface and/or recreated on a processor driven screen which films or otherwise tracks the event. The simulated progressions can further replicate the desired motions of the positional player's intended motions or those of an opposing positional player and in lieu of the actual player being on the playing surface.

U.S. Patent Publication No. 2014/0111379 for position-determining system and method for the operation thereof by inventors Schelten, et al., filed May 4, 2012 and published Apr. 24, 2014, is directed to a system for determining position including at least one transmitter connected to the object, at least two stationary receivers, and means for determining the phase difference with which the signal of the transmitter arrives at the two receivers. Compared to conventional radio direction finding (decca direction finding), transmission takes place only at the location of the mobile object. This has the effect that only one transmitter having very small dimensions and very low power consumption is required at the location of the mobile object. At least one pair of two stationary receivers is used for operation to determine at least one space coordinate of the object position, the measuring region for the object position being located between these receivers at this space coordinate. The position can be determined with high accuracy if the three space coordinates thereof are determined separately using at least one dedicated receiver pair.

U.S. Patent Publication No. 2009/0298588 for method of automatically detecting offside in soccer using fixed and wireless sensors and central server by inventors Gopinath, et al., filed May 31, 2008 and published Dec. 3, 2009, is directed to a method of accurately determining if an offense soccer player is in an offside position. This is determined using a combination of sensors on the players and the ball which are then sensed using fixed sensors on the field. The instantaneous sensor readings are used to locate each player, offense and defense with respect to the location of the ball and goal posts. These data are analyzed using an algorithm on a computer which can then determine if the player was in an offside position.

U.S. Patent Publication No. 2003/0049590 for determining position of players on a sport field by inventor Feldbau, filed Sep. 10, 2002 and published Mar. 13, 2003, is directed to a system for, and method of determining an offside position of a player on a football field, the system including: (a) at least one surveying instrument for surveying the field and capturing optical data, and (b) a computer operatively connected so as to receive the optical data from the surveying instrument, the computer having digital analysis software, the computer designed and configured to transmit an output, the digital analysis software for: (i) determining, in real time, from the optical data, a position of a playing ball, and positions of players from an offensive team and from a defensive team; (ii) identifying a forward ball-pass made by the offensive team; (iii) determining, in real time, the positions of the players from the offensive team and from the defensive team, at a time that the forward ball-pass was performed, and (iv) determining whether at least one of the players is in the offside position.

U.S. Pat. No. 9,978,425 for method and device for associating frames in a video of an activity of a person with an event by inventors Kirk, et al., filed Apr. 25, 2016 and issued May 22, 2018, is directed to methods and systems for associating frames in a video of an activity of a person with an event. The methods include recording a video of an activity of a person; storing a time-series of a plurality of sensor data obtained from a sensor assembly of at least one sensor coupled to the person while the person is performing the activity; synchronizing the video with the sensor data; detecting an event in the time-series; and associating the event with at least one corresponding frame in the video showing the event.

U.S. Pat. No. 9,747,870 for method, apparatus, and computer-readable medium for superimposing a graphic on a first image generated from cut-out of a second image by inventors Gillard, et al., filed Sep. 22, 2014 and issued Aug. 29, 2017, is directed to a device for generating a graphic and superimposing the generated graphic on a second image generated from a cut-out of a first image of a scene, the cut-out representing the field of view of a virtual camera, the device comprising: receiver circuitry configured to receive the second image and a set of cut-out corner coordinates; homography determining circuitry configured to determine, a homography between coordinates of the first 2D coordinate system defined within the cut-out and coordinates of a second 2D coordinate system defined for the second image; feature determining circuitry configured to determine a feature of the virtual 3D map of the scene within the field of view of the virtual camera; graphic generator circuitry configured to generate the graphic from the determined feature of the virtual 3D map; and graphic superimposing circuitry configured to superimpose the generated graphic on the second image.

U.S. Pat. No. 9,202,526 for system and method for viewing videos and statistics of sports events by inventors Hohteri, et al., filed Oct. 25, 2012 and issued Dec. 1, 2015, is directed to a portable computing device for enabling user to view video content of sports activity such as basketball or ice hockey. The computing device is configured to receive video content, video clips, statistics of the game as well as spatial position data of players and position data of for example a ball used in the game as functions of time. Spectators can use the portable computing device to view spatial position of the players and the ball at given time of the game or view spatial position of the players and/or the ball based on set filters by the user. User can for example select to see spatial position of players in at the times when the team scored or according to other statistics. The user/spectator can use the user interface to select an icon of a player to see corresponding video clip of actions in the sports field.

U.S. Pat. No. 8,358,907 for display control apparatus, display control method, and program by inventors Inagaki, et al., filed Sep. 22, 2009 and issued Jan. 22, 2013 is directed to a display control apparatus including a receiving unit that receives a television broadcast signal containing at least remote broadcast image information, a display unit that displays image information, a recording and reproducing unit that records and reproduces the image information, a player information acquiring unit that acquires, from the remote broadcast image information, player information regarding players in a sports game included in a broadcast image signal, and a recording and reproducing control function unit that receives an audio signal contained in the broadcast signal, generates an excitation graph representing the level of excitation of the sports game along a time line, and records the excitation graph, the image of the game, time information, and the player information in the recording and reproducing unit. Upon receiving information indicating a break in the sports game, the recording and reproducing control function unit displays the excitation graph together with the recorded image.

U.S. Pat. No. 8,300,935 for method and system for the detection and the classification of events during motion actions by inventors Distante, et al., filed Apr. 19, 2006 and issued Oct. 30, 2012, is directed to a system for detecting and classifying events during motion actions, in particular "offside" event in the football game. The system allows determining such event in a real-time and semi-automatic context, by taking into account the variability of the environmental conditions and of the dynamics of the events which can be traced back to the offside. The patent proposes itself with a not-invasive technique, compatible with the usual course of the match.

U.S. Pat. No. 8,279,282 for display control apparatus, display control method, and program by inventors Inagaki, et al., filed Sep. 22, 2009 and issued Oct. 2, 2012, is directed to a display control apparatus including a receiving unit that receives a television broadcast signal containing at least remote broadcast image information, a display unit that displays image information contained in the television broadcast signal, a player information acquiring unit that acquires, from the remote broadcast image information, information regarding players in a sports game included in a broadcast image signal, a field information acquiring unit that acquires field information from the remote broadcast image information, a player position information acquiring unit that acquires player position information from the image signal using the player information and the field information, a player information providing unit that provides the acquired player information by displaying the player information on the display unit, and a cursor control function unit that sets, using the player position information, a cursor on one of the players selected using the provided player information and displayed on the display unit.

U.S. Pat. No. 8,279,051 for realtime coaching system by inventor Khan, filed Apr. 14, 2008 and issued Oct. 2, 2012 is directed to a method and system for improving the effectiveness of coaches and video game designers for games like soccer, American football, basketball, lacrosse or ice hockey by using RF technology and software. A base station is equipped with a computer programmed with algorithms to track the players and game equipment and thereby produce data of interest to a coach or game designer.

U.S. Pat. No. 6,965,397 for measuring camera attitude by inventors Honey, et al., filed Dec. 27, 1999 and issued Nov. 15, 2005 is directed to a system for using camera attitude sensors with a camera. A camera assembly includes a tripod base, a tripod head interface mounted on the tripod base, a tripod head mounted on the tripod head interface and a camera mounted on the tripod head. The tripod head enables the camera to pan and tilt. The system also includes a first optical encoder for detecting the amount that the camera has been panned and a second optical encoder for detecting the amount that the camera has been tilted. Two inclinometers are mounted on the tripod head interface to measure attitude of the tripod head. Two gyroscopes ("gyros") are mounted on the camera assembly. Data from the encoders, gyros and inclinometers are packaged and sent to graphics production equipment to be used for enhancing video captured by the camera.

SUMMARY OF THE INVENTION

The present invention relates to systems and methods for automated detection and visualization of offside positions in a sports game.

It is an object of this invention to provide an imaging system and a platform for determining when a player is in an offside position in a soccer game. The platform is operable to use location tracking and/or image data to detect a boundary object, e.g., a player, a soccer ball, that determines where offside positions begin. The platform is further operable to continuously update the location of the boundary object.

In one embodiment, the present invention includes a system for automated offside detection and visualization.

In another embodiment, the present invention includes a method for automated offside detection and visualization.

These and other aspects of the present invention will become apparent to those skilled in the art after a reading of the following description of the preferred embodiment when considered with the drawings, as they support the claimed invention.

DETAILED DESCRIPTION

Figure 1:
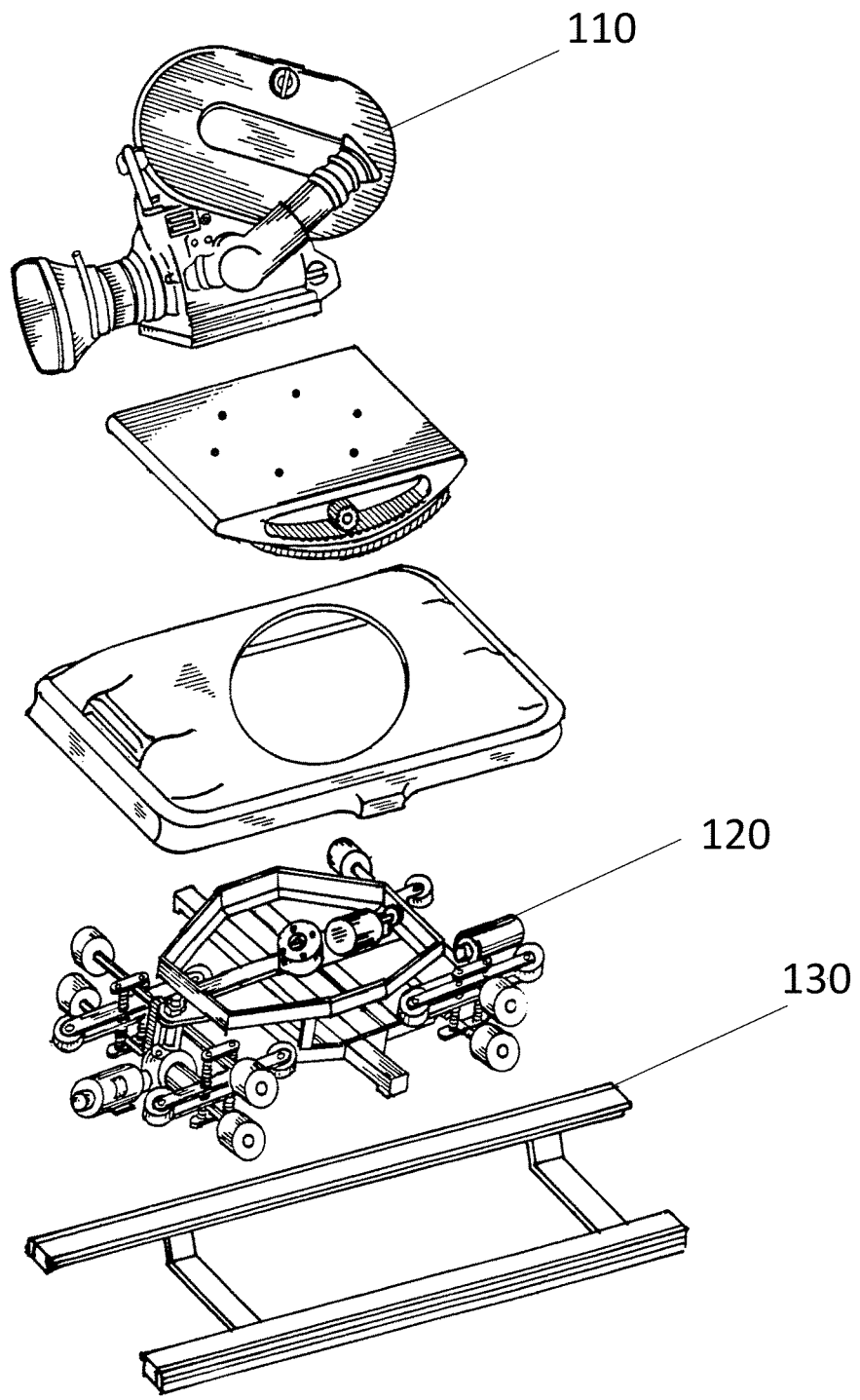
FIG. 1 illustrates one embodiment of the imaging system of the present invention.

The present invention is generally directed to systems and methods for automated and virtual tracking of objects on a sports field and automated and virtual detection and visualization of offside positions in a sports game.

In one embodiment, the present invention includes a system for automated offside detection and visualization.

In another embodiment, the present invention includes a method for automated offside detection and visualization.

None of the prior art discloses a system that uses wearable sensors to track players and that combines wearable sensor data with image data in order to determine offside positions. Prior art also does not disclose using an imaging system on a rail to track offside position in linear motion to eliminate mistakes caused by variations in depth perception.

Referring now to the drawings in general, the illustrations are for the purpose of describing one or more preferred embodiments of the invention and are not intended to limit the invention thereto.

Offside Positions in Soccer

In soccer, an offside position is an illegal position wherein a player is in an opposing team's half of the soccer field and wherein the player is closer to the opposing team's goal line than the soccer ball and a second-nearest player of the opposing team to the opposing team's goal line. The second-nearest player to the goal line is in most cases the first-nearest player excluding the goalie. The boundary for whether a player is in an offside position is determined by a boundary object wherein the boundary object is the closer of the second-nearest player from the opposing team and the soccer ball in play. The boundary is a straight line that is parallel to the goal lines and that intersects an edge or part of the boundary object closest to the opposing team's goal line. A player who is closer to the opposing team's goal line than the boundary object and in the opposing team's half of the soccer field is considered to be in an offside position when the opposing team is not in possession of the ball and when the player is involved in active play, e.g., receiving a ball, interfering with a player on the opposing team, and/or gaining an advantage by being in that position. Offside laws are detailed in the Laws of the Game 2020/21, which was published by the International Football Association Board on Jun. 1, 2020 and which is incorporated herein by reference in its entirety. The present invention is operable to follow the Laws of the Game to determine offside positions. Alternatively, the present invention is operable to follow rulesets that differ from the Laws of the Game, e.g., a ruleset that is used for young children, a ruleset that is used for players with disabilities.

Determination that a player is in an offside position is usually performed by at least one referee wherein the at least one referee performs a visual inspection of the field and the current play to determine whether the player is in an offside position. Typically, a first referee travels around the field while a second referee maintains a position in line with the boundary object for an offside position, e.g., the second-nearest player, the ball, and/or the midfield line. The first referee and the second referee then work together to determine if players are in an offside position. Using human referees to determine offside position results in human error and incorrect calls. The boundary for an offside position is a straight line that is parallel to the goal line and that is located at a body part of the second-nearest player that can be used to score a goal (e.g., a leg, a head, a shoulder) nearest to the goal. Hands and arms are not counted in the boundary for an offside position. If a referee views the boundary object or the boundary at an angle, the depth perception of the referee is a factor in determination of offside position. The apparent position of an object changes when the object is viewed at different angles or from different lines of sight. This change, known as the parallax error, often results in incorrect determinations of offside position depending on the position of the referee relative to a boundary and/or a player who is potentially in an offside position. In addition, determination of offside position depends on possession, whether the ball is in play, and whether a player is involved in active play. In one embodiment, an offside position is thus determined based on at least two simultaneous events and/or motions, e.g., the motion of a ball in a first location and the motion of a player in a second location. Human referees are limited in their ability to monitor the at least two simultaneous events in the middle of an ongoing soccer game to accurately determine offside positions. Human referees also have limited field of view when observing the field wherein the peripheral vision of the referee has lower resolution.

Like many sports, soccer has adopted usage of video assistant referees (VARs) for review of on-field referee decisions. VARs use video footage to check decisions made by referees, allowing for replays and video manipulation including zooming in, pausing, and changing video speed. In one embodiment, video manipulation also includes an addition of graphics, e.g., a crosshair, to a video. However, VAR systems are used retroactively and still rely on a human referee to make assisted rulings based on video data. In addition, VAR systems are limited by the camera systems in use. Stationary camera systems have limited fields of vision, and the angle and position of a camera affect the depth perception and appearance of objects in recorded footage. Stationary camera systems also do not track objects across a field. VAR systems do not incorporate detection (e.g., location detection, offside boundary detection) into the actions of the camera system. Current video-based systems also do not incorporate additional systems and methods for tracking the location and/or movement of players on a field and are thus limited only to visual data.

The present invention is directed to systems and methods for determination and visualization of offside positions in a soccer game. The present invention includes in one embodiment an imaging system, at least one wearable sensor, and/or a platform for monitoring and analyzing the soccer game. The platform is in one embodiment a cloud-based platform. The imaging system is preferably mobile, e.g., on rails, and is operable to track an object on a field, e.g., a boundary object. In one embodiment, the platform of the present invention includes a graphics generator for creating graphics related to the offside position and/or gameplay data. The platform of the present invention is operable to collect data from the imaging system and the at least one wearable sensor in order to perform data analytics on the soccer game in real time or near real time and automatically generate graphics relevant to the rules of the soccer game. The graphics are operable to be overlaid, included with, and/or incorporated into video, including live video or replay video of a game. The platform is operable to determine a boundary object for offside positions and track the boundary object using the imaging system. In one embodiment, the platform is also operable to determine when a player is in an offside position. In one embodiment, the platform includes a user interface wherein the platform is operable to collect game data via the user interface. The game data includes, but is not limited to, a first team, a second team, a first goal being defended by the first team, a second goal being defended by the second team, a roster, a starting lineup, an updated lineup, a player swap, and/or penalty data (e.g., a number of yellow cards, a number of red cards, a time that a penalty is received). The data analytics and the graphics are then operable to be used for making calls in the soccer game.

In one embodiment, the platform includes a rules engine wherein the rules engine is operable to provide sports intelligence. The rules engine is operable to store a plurality of rulesets. In one embodiment, the plurality of rulesets includes rules for different sports games, e.g., hockey, American football, lacrosse. The platform is operable to automatically follow a ruleset as provided by the rules engine, including, but not limited to, a ruleset that follows the Laws of the Game. In one embodiment, the platform is operable to automatically follow a plurality of rulesets as provided by the rules engine. The platform is also operable to automatically switch between rulesets, e.g., between a ruleset for soccer and a ruleset for lacrosse. In one embodiment, automatically switching is based on analysis of image data. Alternatively, the platform is operable to receive a ruleset input wherein the ruleset input determines the ruleset.

Player and Object Tracking on a Sports Field

The at least one wearable sensor includes, but is not limited to, a tag wherein the tag is attached to a clothing article (e.g., a jersey, a uniform, a shirt, a pair of pants, a sock, a shoe, a headband, a kneepad, a sweatband) of a player and/or a body part of a player. Alternatively, the at least one wearable sensor is a wearable worn by a player, including, but not limited to, an activity tracker (e.g., FITBIT, APPLE WATCH, OURA RING, SAMSUNG GALAXY WATCH, WHOOP, GARMIN), a smart garment, and/or a piece of equipment (e.g., a kneepad). In one embodiment, the at least one wearable sensor is operable to track a location, a distance traveled, a displacement, a posture, a speed, an acceleration, and/or a movement. The at least one wearable sensor is operable to record wearable sensor data including, but not limited to, a heart rate, a temperature, an acceleration, a movement, an orientation, a rotation, a speed, a velocity, an angular velocity, a blood oxygen level, a respiration level, a contact, moisture data, and/or humidity data. In one embodiment, the at least one wearable sensor further includes a tracking sensor. The tracking sensor includes, but is not limited to, a radiofrequency identification (RFID) sensor and/or a global positioning system (GPS) sensor. Alternatively, the tracking sensor is operable to emit a signal, e.g., electromagnetic radiation, for location tracking.

The at least one wearable sensor is operable to transmit the wearable sensor data using a wireless communications protocol, including, but not limited to, ultra-wide band (UWB) communication, near field communication (NFC), BLUETOOTH, WI-FI, ISO/IEC communications (e.g., ISO/IEC 21481:2021, which is published by the International Organization for Standardization and the International Electrotechnical Commission (ISO/IEC) in April 2021 and which is incorporated herein by reference in its entirety), ZIGBEE, infrared, mobile broadband, and/or cellular protocols. In one embodiment, the at least one wearable sensor is operable to transmit the wearable sensor data to the platform. Alternatively, a first wearable sensor is operable to transmit signals including, but not limited to, the wearable sensor data to a second wearable sensor. The platform is operable to determine the location of the at least one wearable sensor and thus the player to which the at least one wearable sensor is attached. In one embodiment, the platform is further operable to track the movement of the player via the at least one wearable sensor. In one embodiment, the platform is operable to track the player using a coordinate system of the field. Alternatively, the platform is operable to track a relative location of a player, e.g., a location relative to other players, a location relative to boundaries of the soccer field, a location relative to the ball, and/or a location relative to a goalpost. In yet another embodiment, the location is an absolute location.

The imaging system of the present invention is operable to collect image data, e.g., an image, a video. In one embodiment, the imaging system includes at least one image sensor. The at least one image sensor includes, but is not limited to, a camera, a video camera, a camcorder, a slow-motion video camera, a LIDAR sensor, and/or a high-speed video camera. Alternatively, the at least one image sensor includes a world camera wherein the world camera is operable to capture image data of the field and a scene camera wherein the scene camera is operable to track the location and view of the world camera. In one embodiment, the at least one image sensor has a 90° field of view. In one embodiment, the imaging system further includes at least one location sensor attached to the at least one image sensor wherein the platform is operable to use data from the at least one location sensor to track the at least one image sensor. The at least one location sensor includes, but is not limited to, an RFID transmitter, a GPS transmitter, and/or a signal transmitter wherein the platform is operable to detect signals emitted from the signal transmitter for location detection of the at least one image sensor. In one embodiment, the imaging system further includes at least one field of view (FOV) sensor attached to the at least one image sensor wherein the at least one FOV sensor is operable to determine a field of view of the image data being collected by the at least one image sensor and transmit the field of view to the platform. The at least one FOV sensor includes, but is not limited to, a pan sensor, a tilt sensor, and/or a zoom sensor. In one embodiment, the field of view is transmitted as metadata. Advantageously, field of view data offers more context to the image data, which enables the platform to combine image data from a plurality of image sensors and/or a plurality of timepoints with greater accuracy. The platform is also operable to send signals to the at least one image sensor to adjust the field of view and/or the location.

The imaging system is preferably mobile. In one embodiment, the imaging system includes a chassis wherein the at least one image sensor is mounted on the chassis and wherein the chassis is mounted on a rail. The rail is preferably positioned parallel to a sideline of a soccer field such that the at least one image sensor is operable to move along the sideline of the soccer field. An elevated rail and a non-elevated rail (e.g., a rail on the ground) are both compatible with the present invention. FIG. 1 illustrates one embodiment of the imaging system of the present invention wherein the at least one image sensor 110 is mounted on a chassis 120 and wherein the chassis 120 is mounted on a rail 130. Advantageously, the at least one image sensor 110 mounted on a rail 130 is operable to capture image data while only moving in one direction. Linear motion of the at least one image sensor 110 parallel to the sideline of the soccer field eliminates variations in depth perception that arise if the at least one image sensor 110 were to move in two dimensions, e.g., both parallel and perpendicular to the sideline of the soccer field. The linear motion means that relative location of objects and/or the distance between objects along a first axis formed by the sideline of the soccer field is consistent regardless of the relative locations of the objects to each other and to the at least one image sensor 110 along a second axis formed by the goal lines of the soccer field. When determining whether a player is in an offside position, only the location of the player along the first axis formed by the sideline of the soccer field is used. The image system in this embodiment thus captures image data in a way that clearly indicates location along the first axis without taking into account variation along the second axis, which is irrelevant for determining offside position. In a preferred embodiment, the height of the at least one image sensor 110 does not change. Vertical motion adds yet another dimension, which adds further variability in depth perception. Alternatively, the at least one image sensor 110 is mounted on a drone wherein the drone is operable for linear motion.

Figure 2:
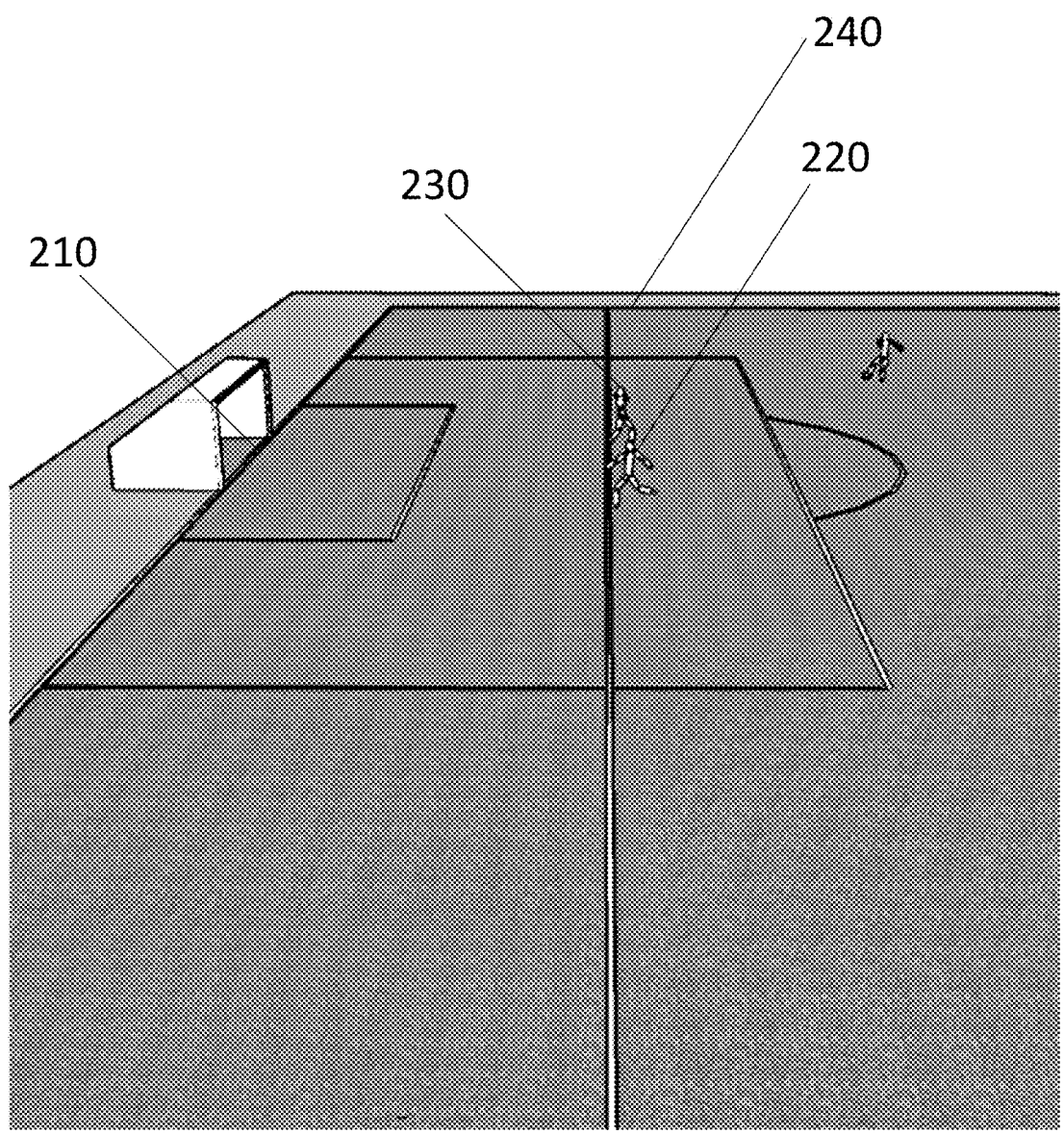
FIG. 2 illustrates one embodiment of the image data of the present invention.

FIG. 2 illustrates an example embodiment of image data captured by an image sensor. The FOV of the image sensor includes the goal line 210 and a first player 220 and a second player 230 closest to the goal line 210. The image sensor is also operable to move in a direction parallel to the sideline 240 of the field.

In one embodiment, the imaging system includes a plurality of image sensors. For example, the imaging system includes a first image sensor mounted on a first chassis wherein the first chassis is mounted on a rail parallel to the sideline of the soccer field and wherein the first chassis moves within a first half of the soccer field, e.g., from a first goal line to a midfield line. The imaging system further includes a second image sensor mounted on a second chassis wherein the second chassis is also mounted on the rail but wherein the second chassis moves within the second half of the soccer field, e.g., from a second goal line to the midfield line. Alternatively, the first chassis is mounted on a first rail wherein the first rail is parallel to the sideline of the soccer field and wherein the first rail spans a first half of the soccer field while the second chassis is mounted on a second rail wherein the second rail is also parallel to the sideline of the soccer field and wherein the second rail spans a second half of the soccer field. The first half of the soccer field and the second half of the soccer field are not overlapping. In a soccer match, it is possible that the soccer ball will be kicked from one side of the field to the other, thus changing the boundary for an offside position rapidly. A plurality of image sensors enables the imaging system to respond more rapidly to changes in position of the boundary object. In an alternative embodiment, the imaging system includes a plurality of image sensors wherein at least one of the plurality of image sensors is stationary. A stationary image sensor is in one embodiment used for broadcasting and/or recording purposes. Alternatively, the stationary image sensor is used to track non-boundary objects. The platform is operable to collect and synchronize image data from a plurality of image sensors to determine a boundary object, an offside position, and/or active play.

Figure 3:
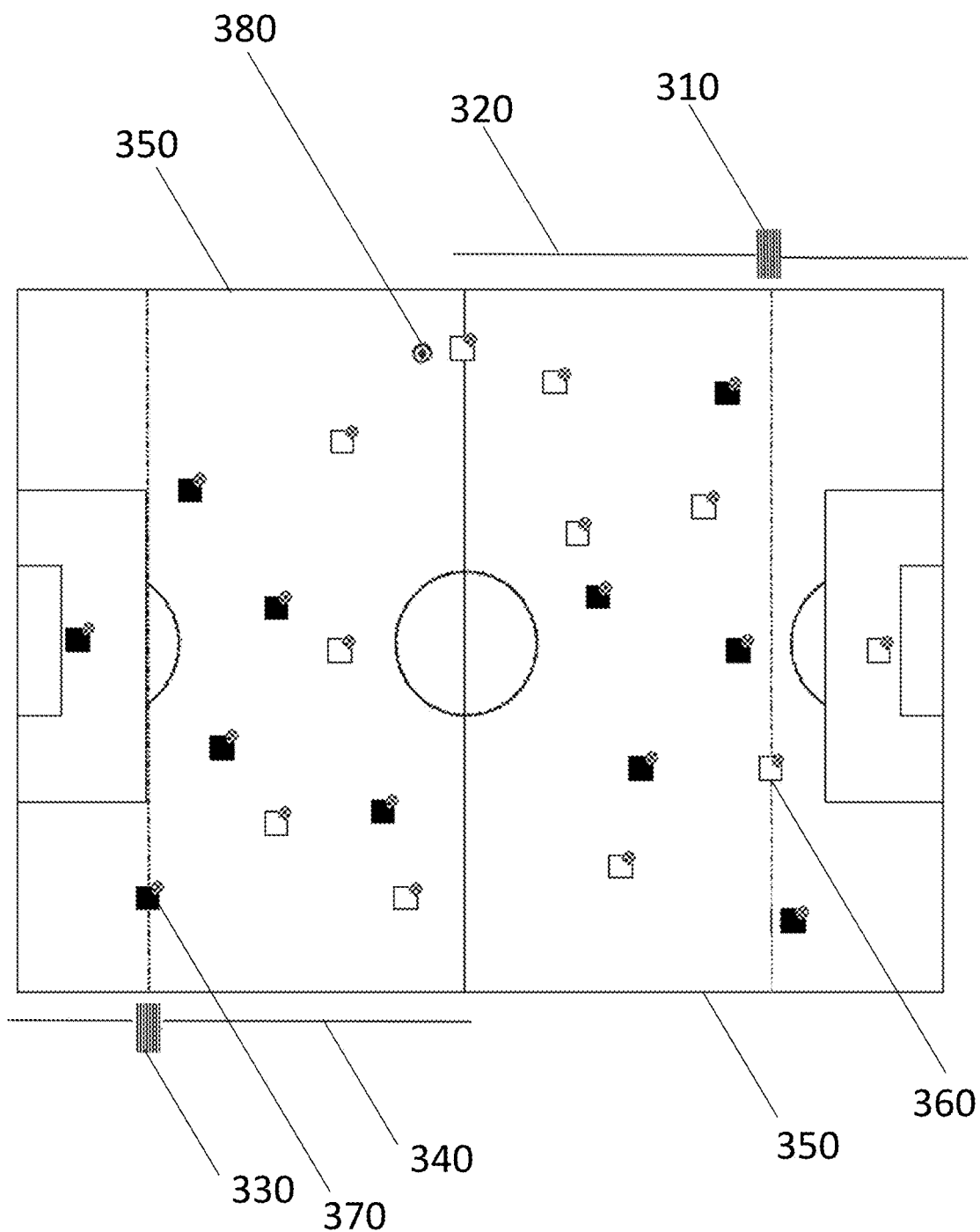
FIG. 3 illustrates one embodiment of the imaging system of the present invention.

FIG. 3 illustrates one embodiment of the present invention wherein the imaging system includes a plurality of image sensors. A first image sensor 310 is mounted on a first rail 320 while a second image sensor 330 is mounted on a second rail 340. The first rail 320 and the second rail 340 are both parallel to the sidelines of the field 350. The first image sensor 310 is in line with a first player 360 from a first team. The second image sensor 330 is in line with a second player 370 from a second team. However, whether the first player 360 or the second player 370 is determined by the platform to be the boundary object depends on the possession of the soccer ball 380. Thus, having a first image sensor 310 and a second image sensor 330 is advantageous because it allows the imaging system to respond to the determination of a boundary object and track the boundary object quickly.

The platform is operable to combine the wearable sensor data collected from the at least one wearable sensor in real time or near real time with the image data collected from the at least one imaging system in real time or near real time in order to more accurately track the location and/or the movement of a player as described in U.S. Pat. No. 10,086, 231, which was filed Mar. 6, 2017 and which is incorporated herein by reference in its entirety and in U.S. Pat. No. 10,471,304, which was filed Oct. 1, 2018 and which is incorporated herein by reference in its entirety. In one embodiment, the platform is operable for sensor fusion wherein the platform is operable to use wearable sensor data from a plurality of wearable sensors to track the location and/or movement of a player. The platform is operable to track the location and/or the movement of each of a plurality of players on a field. In one embodiment, the platform is operable to distinguish between a first set of players from a first team and a second set of players from a second team when the first set of players and the second set of players are both on the field.

In one embodiment, the platform of the present invention is operable to track a ball, e.g., a soccer ball. In one embodiment, the present invention includes a ball sensor wherein the ball sensor is attached to the soccer ball such that the soccer ball still meets standard regulations for soccer play. In one embodiment, the ball sensor is operable to transmit ball sensor data including, but not limited to, location data, motion data, speed data, velocity data, acceleration data, orientation data, and/or contact data. Alternatively, the platform uses the image data to track the ball. In yet another alternative, the platform uses both the ball sensor data and the image data to track the ball. Tracking the ball enables the platform to detect events and/or actions involving both a player and a ball on the field. In one embodiment, the platform is operable to detect an event and/or an action including, but not limited to, a kick, a pass, a dribble, a trajectory of a ball, a trajectory of a player, a dive, a jump, a header, a contact (e.g., a contact between a first player and a second player, a contact between a player and a ball), an impact, a foul, an attempted goal, a goal, a block, an interception, a possession, a change in possession, and/or a steal. In one embodiment, the platform is further operable to detect which goal is being defended by which team. Knowing which goal is being defended by which team is relevant because a player cannot be in an offside position on the half of the field that their team is defending. The platform is preferably operable to track a player and/or a ball in real time or near real time.

Determination of Offside Positions

The platform is operable to determine a boundary object (e.g., the ball, a player) for offside positions based on the location of the players and/or the ball on the soccer field. In one embodiment, the game data received by the platform includes rules regarding offside positions, e.g., the Laws of the Game. The platform then uses the rules to analyze the image data, the ball sensor data, and/or the wearable sensor data in order to determine the boundary object. In one embodiment, the platform includes game data when identifying the boundary object. For example, the boundary object is a player. The platform attaches game data to the boundary object including, but not limited to, a name, a jersey number, a number of fouls, etc. The platform is preferably in network communication with the imaging system such that the at least one image sensor of the imaging system is operable to track the boundary object. The imaging system is preferably operable to move autonomously, e.g., without human actuation or intervention. In a preferred embodiment, the imaging system is operable to move such that it is aimed at approximately a 90 degree angle relative to an adjacent sideline. This allows the imaging system to define a boundary that is directed straight across the field. In one embodiment, the at least one image sensor follows the boundary object by moving along a rail and captures image data of the boundary object in real time or near real time. If the boundary object changes, e.g., a player switches positions, the platform is operable to update the boundary object and transmit the updated boundary object to the imaging system for continuous tracking. Any distribution of data collection and data analysis between the platform and the imaging system is compatible with the present invention. For example, in one non-limiting embodiment, the platform is operable to perform all image analysis, including, but not limited to, computer vision and object detection of the image data. In an alternative non-limiting embodiment, the imaging system is operable to perform image analysis on the image data. In one embodiment, the platform is operable to receive user input regarding an offside position including, but not limited to, a confirmation of the offside position, a dispute regarding the offside position, a dismissal of the offside position, and/or an identification of the offside position.

Figure 4:
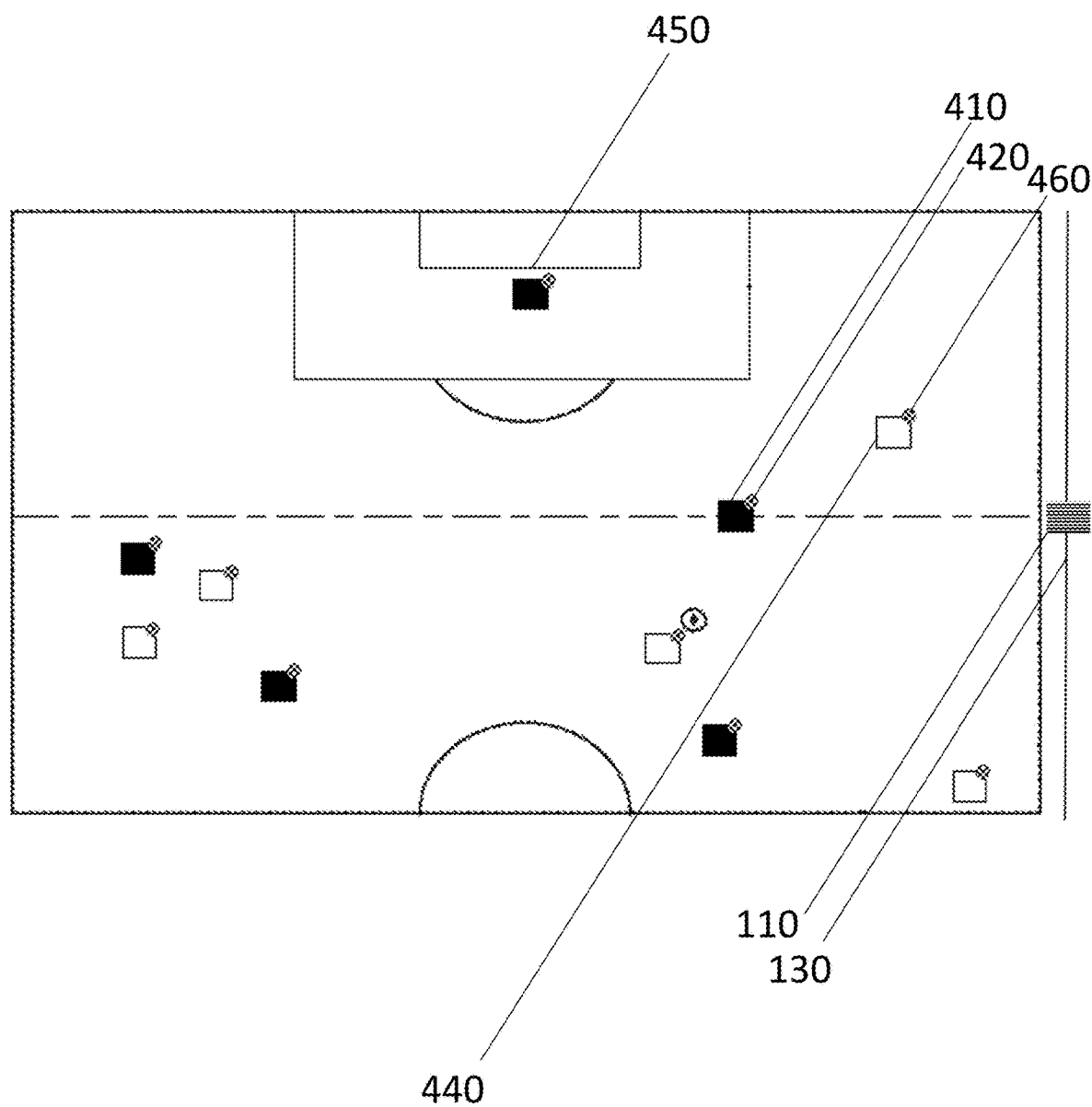
FIG. 4 illustrates one embodiment of offside detection in the present invention.

FIG. 4 illustrates an embodiment of the present invention wherein the boundary object is a first player 410. A first wearable sensor 420 is attached to the first player 410. The imaging system includes an image sensor 110 wherein the image sensor 110 is mounted on a rail 130. The rail 130 runs parallel to the sideline of the field. When the first player 410 moves, the image sensor 110 is operable to move along the rail 130 to follow the first player 410. In this embodiment, a second player 440 from an opposing team is determined to be in an offside position by the platform because the second player 440 is closer to the goal line 450 than the first player 410 who is the second-nearest player on their team to the goal line 450. A second wearable sensor 460 is attached to the second player 440.

Figure 5:
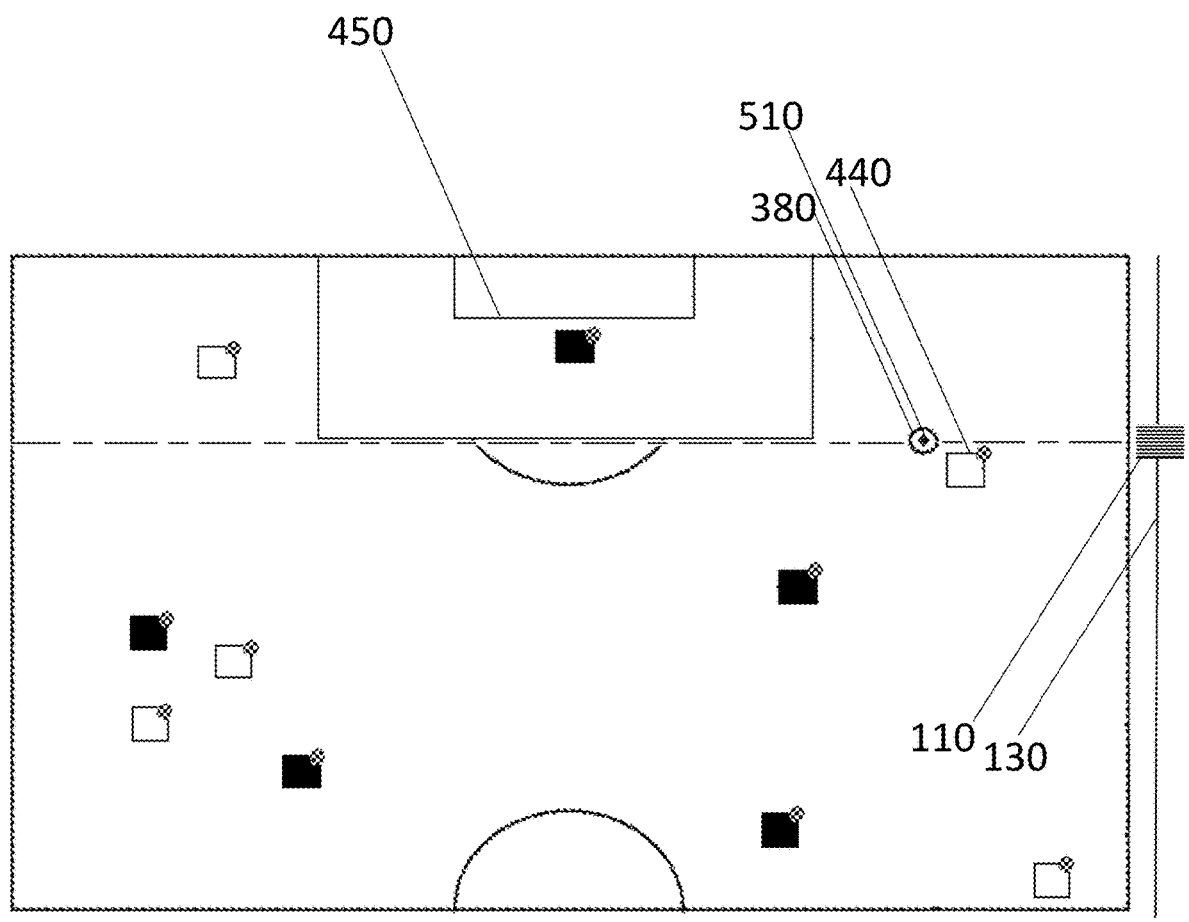
FIG. 5 illustrates an alternate embodiment of offside detection in the present invention.

FIG. 5 illustrates an alternative embodiment of the present invention wherein the boundary object is the soccer ball 380. A ball sensor 510 is attached to the soccer ball 380 wherein the platform is operable to detect the location of the soccer ball 380 using the ball sensor 510. Alternatively, the soccer ball 380 emits electromagnetic radiation that allows for detection of the soccer ball 380 by the platform. The image sensor 110 is mounted on a rail 130 and tracks the soccer ball 380 as the boundary object. The second player 440 from the opposing team is still determined to be in an offside position by the platform because the second player 440 is closer to the goal line 450 than the soccer ball 380.

In one embodiment, the platform is further operable to determine if any players are in an offside position and/or which players are in an offside position using the wearable sensor data and/or the image data. For example, once the platform has determined the location of the boundary object, the platform is operable to use the wearable sensor data to determine that a player is between the boundary object and the proper goal line and thus in an offside position. According to the Laws of the Game, determination of an offside position depends on any body part except the hands and the arms of a player because the player is not allowed to touch the ball with their hands and arms. Likewise, if the boundary object is a player, the boundary for an offside position set by boundary object (the player) is based on the body part of the player nearest to the player's goal line excluding the hands and the arms. In one embodiment, the platform is operable to distinguish between the body parts of a player using the image data and/or the wearable sensor data to determine an offside boundary. In another embodiment, the platform is operable to determine the offside boundary when the boundary object is in the air. For example, a soccer ball is kicked high and flies through the air. The boundary set by the soccer ball moves with the soccer ball. Even when the soccer ball is in the air, the platform is operable to determine the corresponding position on the ground directly below the soccer ball that constitutes the boundary for an offside position. Alternatively, a player is in motion and jumps over the boundary for an offside position while running. The platform is operable to detect that the player has crossed into an offside position even if the player is not touching the ground.

The Laws of the Game further state that a player is in an offside position if the player is involved in active play at the moment that the soccer ball is played or touched. Active play is defined by the IFAB as interfering with play by touching a ball or a teammate, interfering with an opponent, attempting to play a ball when the action impacts on an opponent, or making an obvious action which impacts the ability of an opponent to play the ball. In traditional soccer games, a determination of active play is subjective, based on the opinion of at least one referee. In one embodiment, the platform of the present invention is operable to make the determination of active play using the wearable sensor data, the ball sensor data, and/or the image data. For example, the wearable sensor data includes contact data wherein the platform is operable to determine based on the contact data that a first player is touching or interfering with a second player (an opponent) based on the wearable sensor data. If the first player is located in an offside position, the platform is then operable to determine that the player is indeed considered offside because the player is in active play, which is a penalizable offence.

In one embodiment, the imaging system is operable to use a plurality of image sensors to determine whether a player is offside. For example, a rail-mounted image sensor is operable to determine that a player is in an offside position. A stationary image sensor located above the field is operable to determine that the player is in active play using a different field of view. The imaging system is then operable to sync a first set of image data collected by the first image sensor and a second set of image data collected by the second image sensor to determine if the player was in an offside position while in active play. Alternatively, because active play is determined at the moment that the soccer ball is played or touched, the platform is operable to determine using ball sensor data the moment that the soccer ball is touched. The platform is then operable to synchronize the ball sensor data with image data to determine whether a player is in active play at the moment that the soccer ball is touched.

In an alternative embodiment, the platform is operable to recognize when a player crosses an offside boundary set by the boundary object using the imaging system and/or the wearable sensor data. Because the at least one image sensor continuously tracks the boundary object from the sideline of the soccer field, the field of view of the at least one image sensor includes the offside boundary set by the boundary object, which is a straight line perpendicular to the sideline of the field. Thus, if a player crosses from a non-offside position to an offside position by passing the boundary object and moving closer to the opposing goal line, the footage will be captured by the at least one image sensor. In one embodiment, the platform is operable to determine the identity of a player who crosses into an offside position using the image data, the wearable sensor data, and/or the game data.

In one embodiment, the present invention is operable to determine offside position in the case of a set piece. A set piece refers to a situation when a ball is returned to open play, e.g., a free kick, a corner kick, a throw-in, a penalty. During a set piece, it is more likely that players are crowded around each other and/or in contact with each other. Headers are also common. In addition, players move very quickly before, during, and after the set piece in order to secure an optimal position on the field. In some cases, a team sets an offside trap during a set piece, wherein players on a first team position themselves such that players on a second team will be in an offside position if the second team gains possession of the ball. Determining whether a player is in an offside position and in active play during a set piece thus requires precise detection in real time or near real time of player location and ball location. The platform of the present invention is operable to use the wearable sensor data, the ball sensor data, and/or image data during a set piece to determine if and/or which players are in an offside position and/or in active play at the moment the ball is returned to play.

Visualization of Sports Field

In one embodiment, the platform of the present invention is operable to generate at least one visualization. The visualization preferably includes image data of the soccer field and at least one graphic wherein the at least one graphic is generated by the graphics generator. In one embodiment, the at least one graphic includes a visual representation of the boundary for offsides positions (e.g., a solid line) superimposed onto an image of the soccer field. Alternatively, the graphic is dynamic and is superimposed onto a video of the soccer field. Live images and recorded images are compatible with visualizations of the present invention. When the camera moves, the graphic also moves in order to ensure an accurate visualization. When the boundary object and thus the boundary moves, the graphic also moves in order to ensure an accurate visualization. The graphics generator is operable to combine the wearable sensor data, the image data, the ball sensor data, and/or the game data in creating graphics. In a non-limiting example, the graphic includes a circle around a player in an offside position and a sidebar stating the name of the player and recent statistics related to the player. In yet another alternate embodiment, the graphics generator is operable to apply a color to an area of the image and/or video. For example, once the boundary for an offside position has been established, the graphics generator is operable to add a color different from the color of the field to any part of the field that includes an offside position. This graphic makes it easy to determine if a player is in an offside position. The platform is operable to update the at least one visualization in real time or near real time. In one embodiment, the platform is operable to display the visualization on a live broadcast. In an alternative embodiment, the platform is operable to create at least one visualization with graphics in an augmented reality (AR) environment, a virtual reality (VR) environment, and/or a mixed reality (MR) environment.

In one embodiment, the at least one visualization further includes game statistics and/or event detection. For example, the platform is operable to identify when a ball is passed from a first player to a second player using the wearable sensor data and/or the ball sensor data. The platform is further operable to identify a trajectory of the pass. The graphics generator is then operable to create a graphic displaying that a pass occurred, the identity of the first player, the identity of the second player, and the trajectory of the pass between the first player and the second player. In one embodiment, the platform is further operable to create a visualization wherein the visualization does not include image data of the field. For example, the platform is operable to create a two-dimensional (2D) representation of the field wherein the players and the ball are represented as shapes and wherein the boundary line for an offside position is represented as a line.

In one embodiment, the present invention is operable to insert content (e.g., graphics) into an image sequence and to perform video event statistic tracking as included in the following: U.S. Pat. No. 5,917,553, filed Oct. 22, 1996, U.S. Pat. No. 6,141,060, filed Mar. 5, 1999, U.S. patent application Ser. No. 09/627,106, filed Jul. 27, 2000, and U.S. Pat. No. 7,154,540, filed Apr. 27, 2001, each of which is incorporated herein by reference in its entirety. In one embodiment, the present invention is further operable to insert content into an image sequence and to perform video event statistic tracking as detailed in the following: U.S. Pat. No. 5,504,312, filed Dec. 7, 1993, U.S. Pat. No. 7,116,342, filed Jul. 3, 2003, and U.S. Pat. No. 7,868,914, filed Jun. 7, 2005, each of which is incorporated herein by reference in its entirety.

Figure 6:
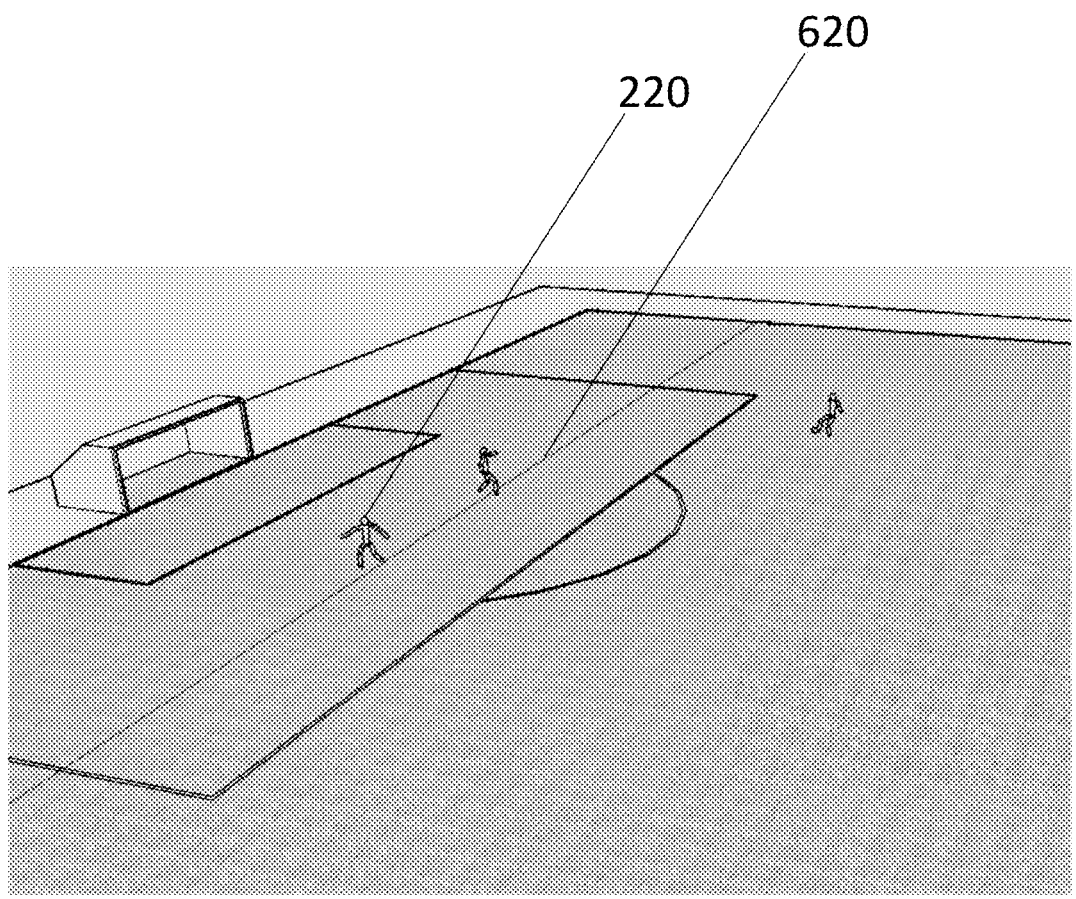
FIG. 6 illustrates one embodiment of a visualization of the present invention.
Figure 7:
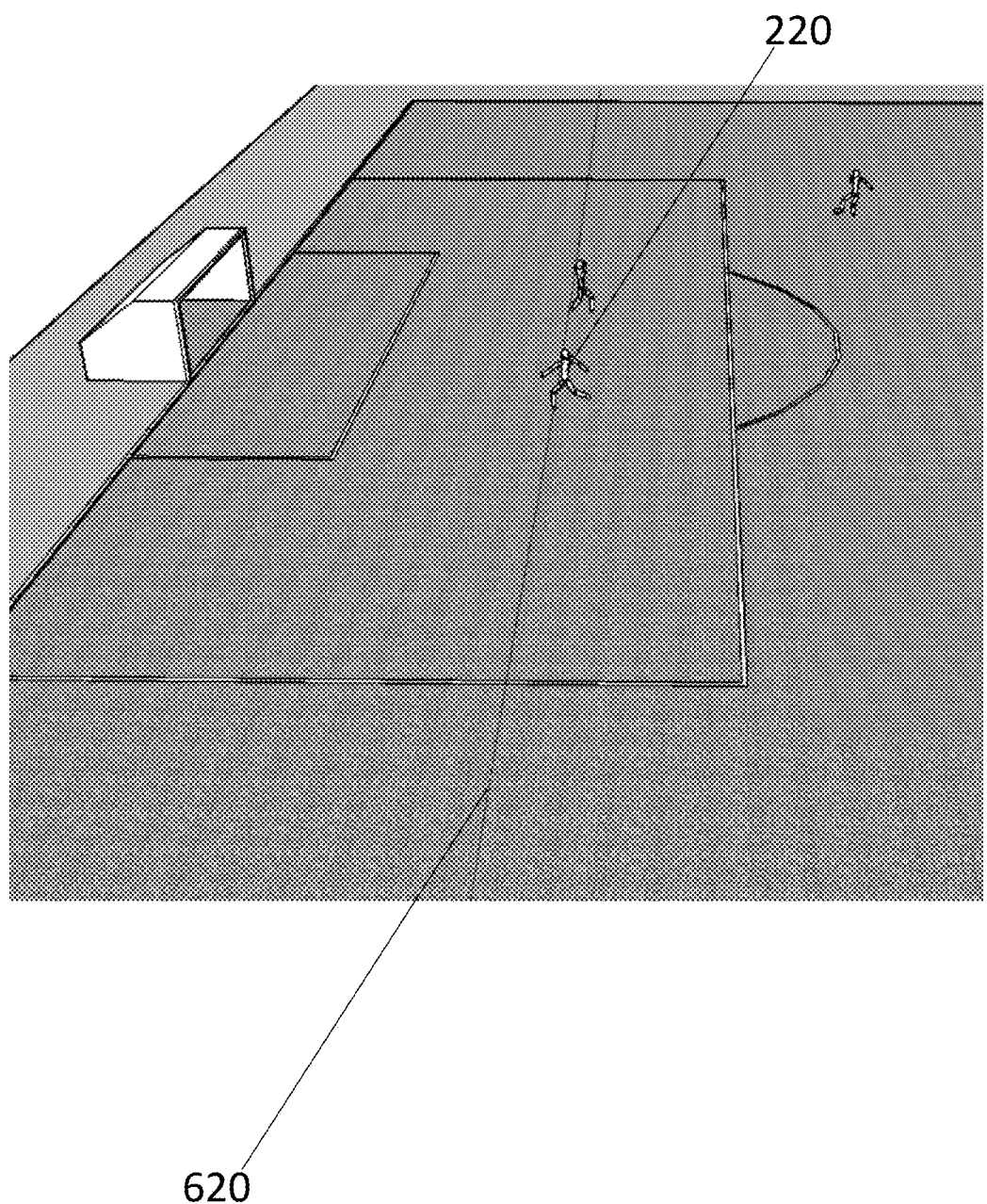
FIG. 7 illustrates an alternate embodiment of a visualization of the present invention.

FIG. 6 illustrates an example visualization of the present invention. The platform determines that a first player 220 is the boundary object. The graphics generator superimposes a line 620 on the field to indicate the boundary for an offside position. FIG. 7 illustrates another embodiment of a visualization of the present invention using a camera with a different field of view. The platform determines that a first player 220 is the boundary object. The graphics generator superimposes a line 620 on the field to indicate the boundary for an offside position.

The present invention is compatible with a plurality of sports and/or athletic activities including, but not limited to, ice hockey, rugby, lacrosse, American football, and/or bandy. The rules for an offside position are different for each sport. For example, offside position in lacrosse is determined by the number of players in one area of the field during a possession and is not dependent on the location of the ball. In one embodiment, the platform is operable to switch between a plurality of sports. The platform is operable to adjust the motion and/or the field of view of the imaging system to capture relevant image data. The platform is also operable to adjust usage of the wearable sensor data in determining offside position. For example, active play determination using wearable sensor data such as motion data or contact data is only necessary for soccer; thus, the platform does not use motion data or contact data for determining an offside position in a different sport. The platform is also operable to adjust for variations on offside rules within the same sport, e.g., for men's lacrosse and women's lacrosse.

The platform is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The platform is operable to use any of the aforementioned learning techniques alone or in combination.

Further, the platform is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The platform is preferably operable to recommend and/or perform actions based on historical data, external data sources, ML, AI, NNs, and/or other learning techniques. The platform is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Figure 8:
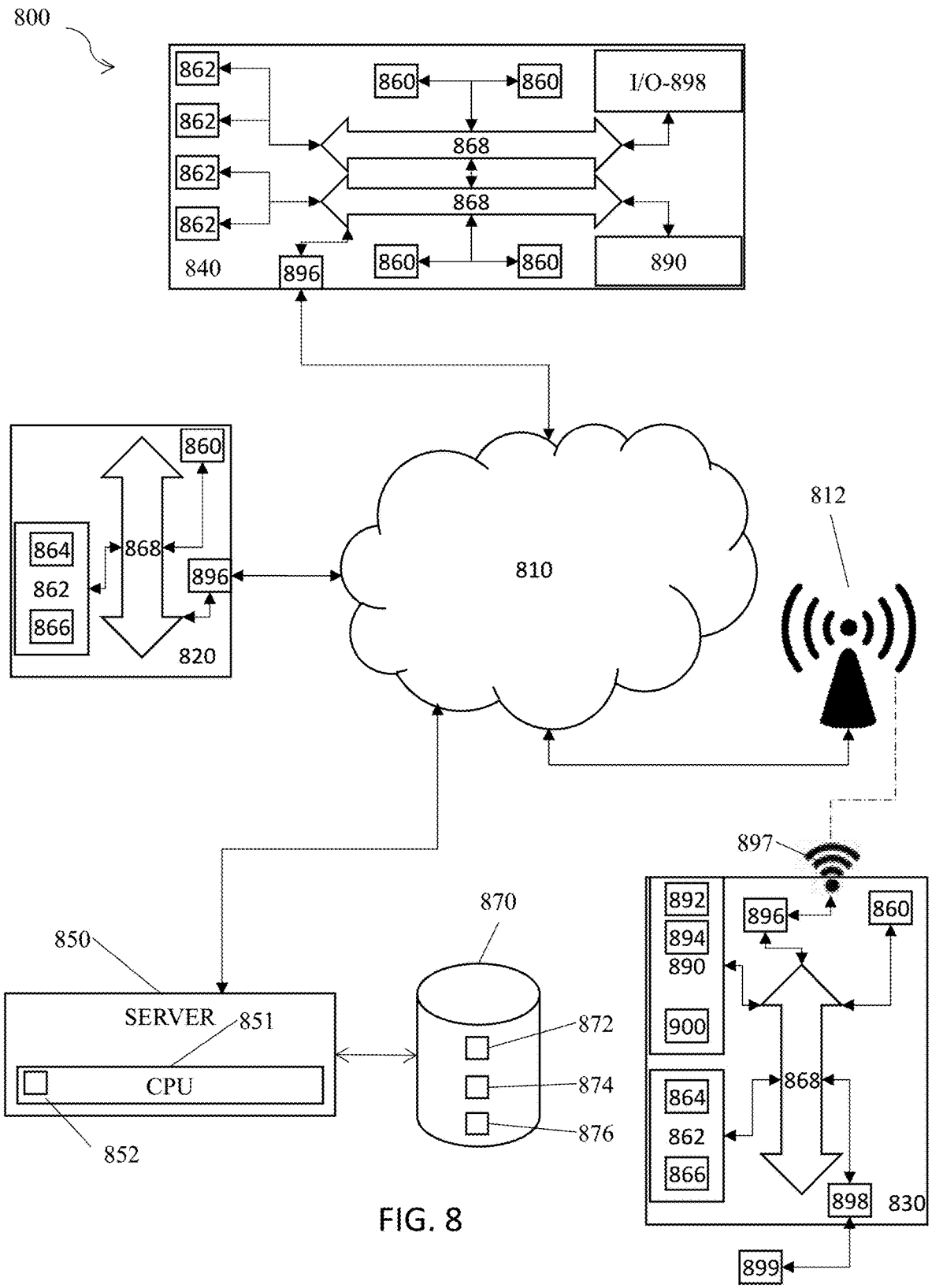
FIG. 8 is a schematic diagram of the present invention.

FIG. 8 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 8, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 8, is operable to include other components that are not explicitly shown in FIG. 8, or is operable to utilize an architecture completely different than that shown in FIG. 8. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. By way of example and not limitation, the systems and methods of the present invention may be applied to video games of these sports or other sports. While the players are virtual, their position data would be determined virtually instead of through real-time sensors. In another embodiment, sensors from augmented reality (AR) or virtual reality (VR) are utilized in combination with virtual data or individually to determine player position and the offsides line. All modifications and improvements have been deleted herein for the sake of conciseness and readability but are properly within the scope of the present invention.

The invention claimed is:

1. A system for automated offside detection, comprising:
at least one processor in communication with at least one image sensor attached to a chassis, wherein the chassis is configured to move parallel relative to a sideline of a play field;
at least one tracking sensor worn by or attached to at least one player and/or a ball;
wherein the at least one tracking sensor generates location data for the at least one player and/or the ball and transmits the location data to the at least one processor;
wherein the at least one image sensor automatically moves based on the location data such that the at least one image sensor is substantially in line with a first player or with the ball and aimed at approximately a 90 degree angle relative to the sideline;
wherein the at least one image sensor is operable to generate relative position data, including a location of the first player or the ball relative to a second player; and
wherein the at least one processor is operable to generate an alert indicating the second player is offsides based on the relative position data and/or the location data.

2. The system of claim 1, wherein the at least one image sensor includes at least one camera, at least one video camera, at least one camcorder, at least one slow-motion video camera, at least one LIDAR sensor, and/or at least one high-speed video camera.

3. The system of claim 1, wherein the at least one tracking sensor transmits team data to the at least one processor, wherein the team data designates which team the at least one player is associated with.

4. The system of claim 1, wherein the at least one tracking sensor includes at least one radiofrequency identification (RFID) sensor and/or at least one global positioning system (GPS) sensor.

5. The system of claim 1, wherein the at least one image sensor automatically switches which player or ball the at least one image sensor moves to follow based on the location data.

6. The system of claim 1, wherein the position of the at least one image sensor defines a boundary substantially orthogonal to the sideline of the play field, and wherein the alert is generated when one or more players associated with a specific team across the boundary.

7. The system of claim 1, wherein the chassis is attached to a rail substantially parallel to the sideline and wherein the chassis is operable to move along the rail.

8. The system of claim 1, wherein the at least one processor generates a digital boundary overlay on at least one video broadcast, wherein the digital boundary overlay is generated in real-time, and wherein the position of the digital boundary overlay is based on a position of the at least one image sensor, the location data, and/or the relative position data.

9. A method for automated offside detection, comprising:
providing at least one processor in communication with at least one image sensor attached to a chassis;
the chassis being configured to move parallel relative to a sideline of a play field;
providing at least one tracking sensor worn by or attached to at least one player and/or a ball;
the at least one tracking sensor generating location data for the at least one player and/or the ball and transmitting the location data to the at least one processor;
the at least one image sensor automatically moving based on the location data such that the at least one image sensor is substantially in line with a first player or with the ball and is aimed at approximately a 90 degree angle relative to the sideline;
the at least one image sensor generating relative position data, including a location of the first player or the ball relative to a second player; and
the at least one processor generating an alert indicating the second player is offsides based on the relative position data and/or the location data.

10. The method of claim 9, wherein the at least one image sensor includes at least one camera, at least one video camera, at least one camcorder, at least one slow-motion video camera, at least one LIDAR sensor, and/or at least one high-speed video camera.

11. The method of claim 9, further comprising the at least one tracking sensor transmitting team data to the at least one processor, wherein the team data designates which team the at least one player is associated with.

12. The method of claim 9, wherein the at least one tracking sensor includes at least one radiofrequency identification (RFID) sensor and/or at least one global positioning system (GPS) sensor.

13. The method of claim 9, further comprising the at least one image sensor automatically switching which player or ball the at least one image sensor moves to follow based on the location data.

14. The method of claim 9, further comprising the position of the at least one image sensor defining a boundary substantially orthogonal to the sideline of the play field, and the at least one processor generating the alert when one or more players associated with a specific team across the boundary.

15. The method of claim 9, wherein the chassis is attached to a rail substantially parallel to the sideline and wherein the chassis is operable to move along the rail.

16. The method of claim 9, further comprising the at least one processor generating a digital boundary overlay on at least one video broadcast in real-time, wherein the position of the digital boundary overlay is based on a position of the at least one image sensor, the location data, and/or the relative position data.

17. A system for automated offside detection, comprising:
at least one processor in communication with at least one image sensor attached to a chassis, wherein the chassis is configured to move parallel relative to a sideline of a play field;
at least one tracking sensor worn by or attached to at least one player and/or a ball;
wherein the at least one tracking sensor generates location data for the at least one player and/or the ball and transmits the location data to the at least one processor;
wherein the at least one image sensor automatically moves based on the location data such that the at least one image sensor is substantially in line with a first player or with the ball;
wherein the at least one image sensor is operable to generate relative position data, including a location of the first player or the ball relative to a second player;

wherein the at least one processor is operable to generate an alert indicating the second player is offsides based the relative position data and/or the location data; and wherein the at least one processor generates a digital boundary overlay on at least one video broadcast, wherein the digital boundary overlay is generated in real-time, and wherein the position of the digital boundary overlay is based on a position of the at least one image sensor, the location data, and/or the relative position data.

18. The system of claim 17, wherein the at least one image sensor includes at least one camera, at least one video camera, at least one camcorder, at least one slow-motion video camera, at least one LIDAR sensor, and/or at least one high-speed video camera.

19. The system of claim 17, wherein the at least one tracking sensor transmits team data to the at least one processor, wherein the team data designates which team the at least one player is associated with.

20. The system of claim 17, wherein the at least one image sensor automatically switches which player or ball the at least one image sensor moves to follow based on the location data.

\* \* \* \* \*